(12) United States Patent
Yamazaki et al.

(10) Patent No.: US 10,987,986 B2
(45) Date of Patent: Apr. 27, 2021

(54) SUSPENSION DEVICE

(71) Applicant: HONDA MOTOR CO., LTD., Tokyo (JP)

(72) Inventors: Ryosuke Yamazaki, Wako (JP); Takumi Inagaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 192 days.

(21) Appl. No.: 16/156,717

(22) Filed: Oct. 10, 2018

(65) Prior Publication Data

US 2019/0111746 A1 Apr. 18, 2019

(30) Foreign Application Priority Data

Oct. 13, 2017 (JP) .............................. JP2017-199052

(51) Int. Cl.
| | |
|---|---|
| *B60G 17/016* | (2006.01) |
| *B62D 17/00* | (2006.01) |
| *B60G 7/00* | (2006.01) |
| *B60G 3/22* | (2006.01) |
| *B60G 3/20* | (2006.01) |

(52) U.S. Cl.
CPC ................ *B60G 3/22* (2013.01); *B60G 3/20* (2013.01); *B60G 7/006* (2013.01); *B60G 17/016* (2013.01); *B62D 17/00* (2013.01); *B60G 2200/18* (2013.01); *B60G 2200/44* (2013.01); *B60G 2204/421* (2013.01); *B60G 2500/40* (2013.01)

(58) Field of Classification Search
CPC .......... B60G 3/26; B60G 3/265; B60G 7/006; B60G 17/016; B60G 17/0162; B60G 17/0163; B60G 2200/44; B60G 2200/462; B60G 2200/4622; B60G 2500/40
See application file for complete search history.

(56) References Cited

U.S. PATENT DOCUMENTS

| | | | | |
|---|---|---|---|---|
| 4,799,703 A | * | 1/1989 | Mueller ................. | B60G 3/202 280/124.135 |
| 4,815,762 A | * | 3/1989 | Jurr ....................... | B60G 7/006 280/124.141 |
| 4,840,393 A | | 6/1989 | Mueller et al. | |
| 6,170,838 B1 | * | 1/2001 | Laurent .................. | B60G 3/01 280/124.127 |
| 2007/0187917 A1 | * | 8/2007 | Hasegawa ............... | B62D 7/06 280/93.51 |
| 2014/0265201 A1 | * | 9/2014 | Luttinen ................ | B60G 7/006 280/93.512 |

FOREIGN PATENT DOCUMENTS

| | | |
|---|---|---|
| JP | S62-36808 U | 3/1987 |
| JP | S63-199181 A | 8/1988 |

OTHER PUBLICATIONS

Japanese Office Action dated Dec. 4, 2018, 2 pages.

* cited by examiner

*Primary Examiner* — Barry Gooden, Jr.
(74) *Attorney, Agent, or Firm* — Rankin, Hill & Clark LLP

(57) ABSTRACT

A suspension device includes knuckles that rotatably retain rear wheels, an electric actuator that steers the rear wheels, paired tie rods that are connected to the electric actuator via a link mechanism and driven back and forth by the electric actuator, brackets that are rotated by the tie rods, and a lower arm attached to the brackets. Each bracket is rotatable between the knuckle and the lower arm.

4 Claims, 5 Drawing Sheets

SUSPENSION DEVICE

BACKGROUND OF THE INVENTION

1. Field of the Invention

The present invention relates to a suspension device for a steering vehicle having a plurality of arms that retain a wheel.

2. Description of the Related Art

For example, Patent Literature 1 discloses a rear suspension device including a rear-wheel steering actuator (servomotor).

FIG. 7 is a perspective view of the rear suspension device disclosed in Patent Literature 1. As shown in FIG. 7, the rear suspension device 1 disclosed in Patent Literature 1 has a lower arm 2 extending in the vehicle width direction and an intermediate lever 3 attached to an inner portion of the lower arm 2 in the vehicle width direction. A damper spring 4 is attached to a middle portion of the lower arm 2. Further, an intermediate member 5 fixed to a vehicle frame (not shown) is pivotally attached to an upper portion of the intermediate lever 3, and a driving rod 7 of an actuator 6 is pivotally attached to a lower portion of the intermediate lever 3.

PRIOR ART DOCUMENT(S)

Patent Literature(s)

Patent Literature 1: JP S63-199181 A1

The rear suspension device 1 disclosed in Patent Literature 1 steers a rear wheel W by driving the driving rod 7 of the actuator 6 back and forth to shift the intermediate lever 3 at a position where the lower arm 2 is pivotally attached to the intermediate lever 3.

In the rear suspension device 1 disclosed in Patent Literature 1, when the driving rod 7 of the actuator 6 is driven back and forth, an inner end portion (in the vehicle width direction) of the lower arm 2 pivotally supported by the intermediate lever 3 swings up and down. Thereby, the axis of the damper spring 4 attached to the upper surface of the lower arm 2 changes in position (see the dot-dash lines in FIG. 7). The change in the position of the axis of the damper spring 4 may consequently affect the suspension performance of the rear suspension device 1 disclosed in Patent Literature 1.

SUMMARY OF THE INVENTION

The present invention has been made to solve the above problems and has an object to provide a suspension device capable of keeping the position of the axis of a damper spring unchanged when a wheel is steered by an actuator.

To achieve the above object, the present invention provides a suspension device for a steering vehicle having a plurality of arms retaining a wheel, comprising: a retention member that rotatably retains the wheel; an actuator that steers the wheel; a tie rod that is connected to the actuator and driven back and forth by the actuator; a bracket that is rotated by the tie rod; and a lower arm attached to the bracket, wherein the bracket is rotatable between the retention member and the lower arm.

The present invention can achieve a suspension device capable of keeping the position of the axis of a damper spring unchanged when a wheel is steered by an actuator.

DETAILED DESCRIPTION OF THE EMBODIMENTS

Figure 1:
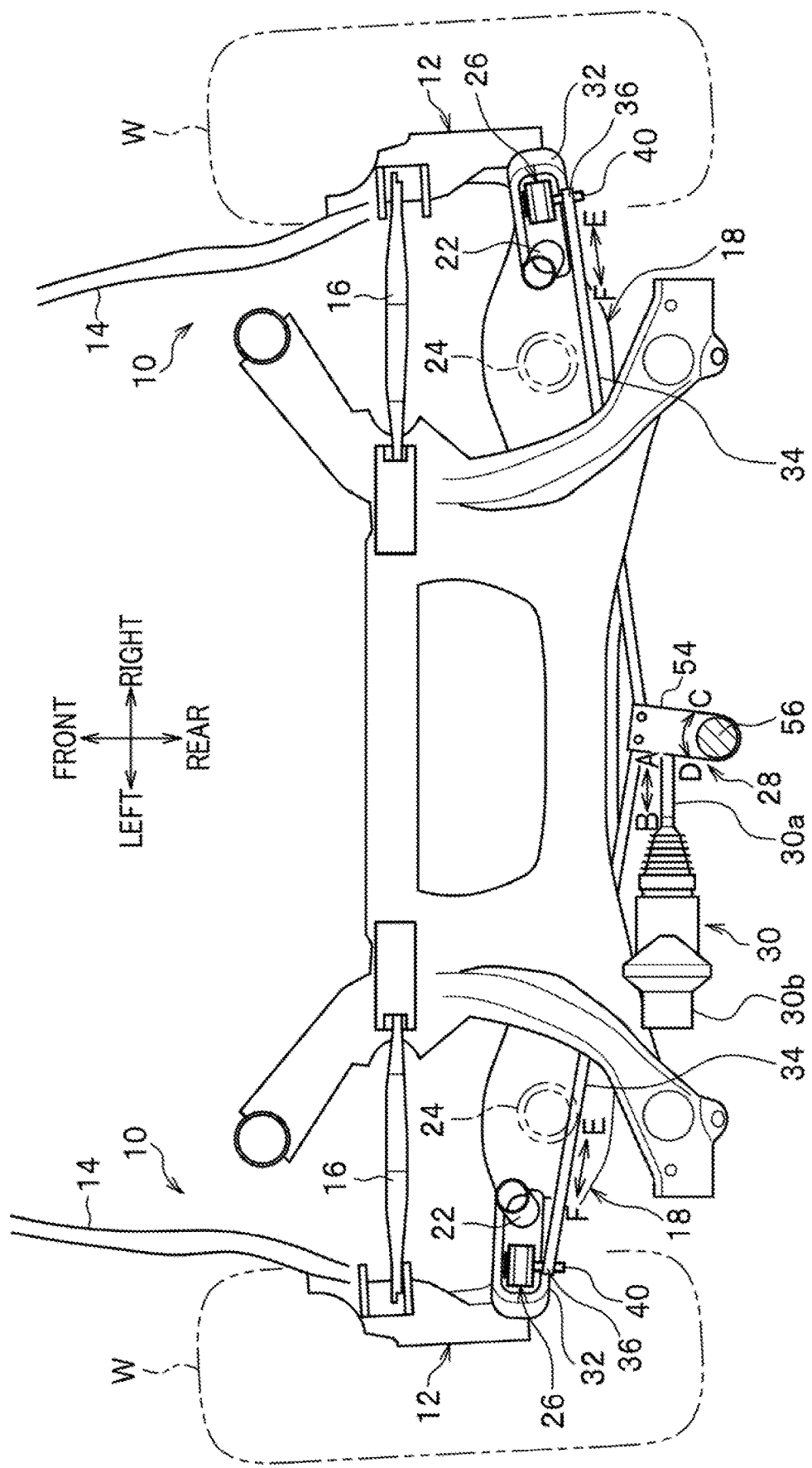
FIG. 1 is a plan view of a rear part of a vehicle where a suspension device according to an embodiment of the present invention is incorporated into each of left and right rear wheels.
Figure 2:
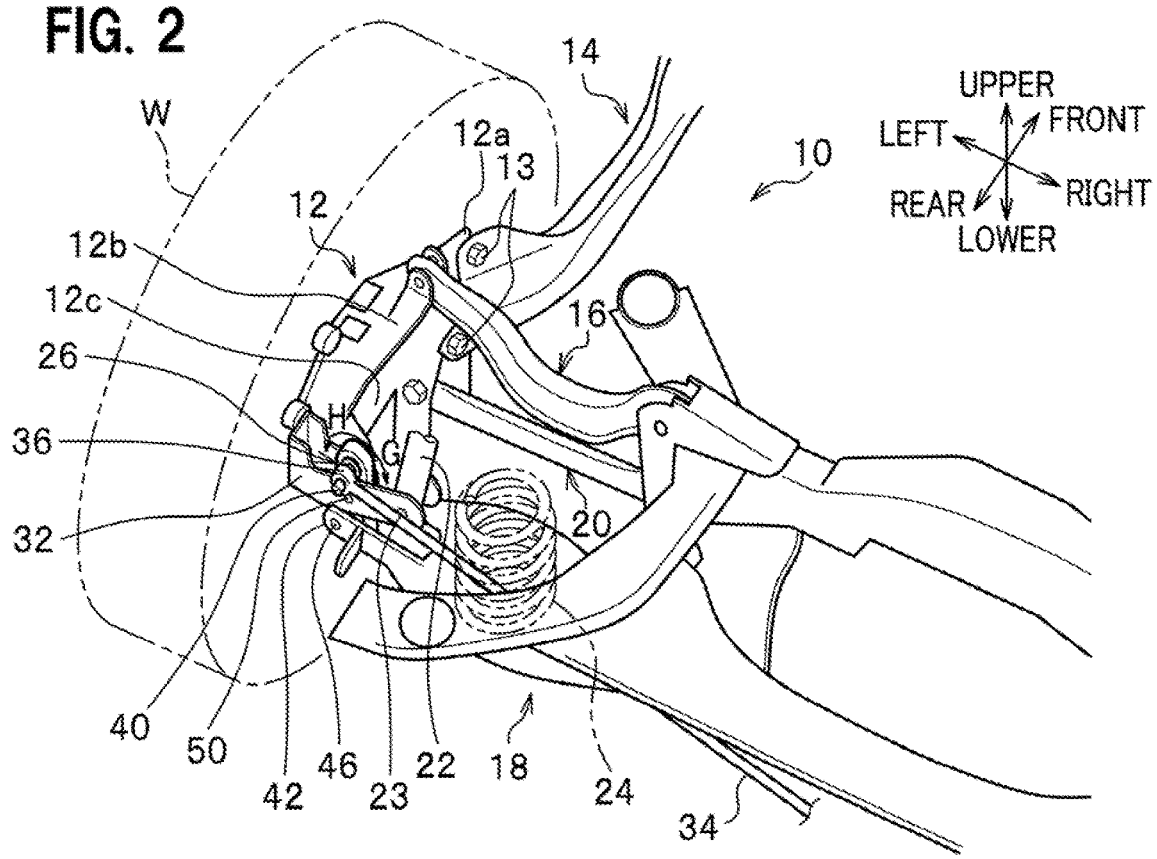
FIG. 2 is a perspective view of the suspension device incorporated into the left rear wheel in FIG. 1.
Figure 3:
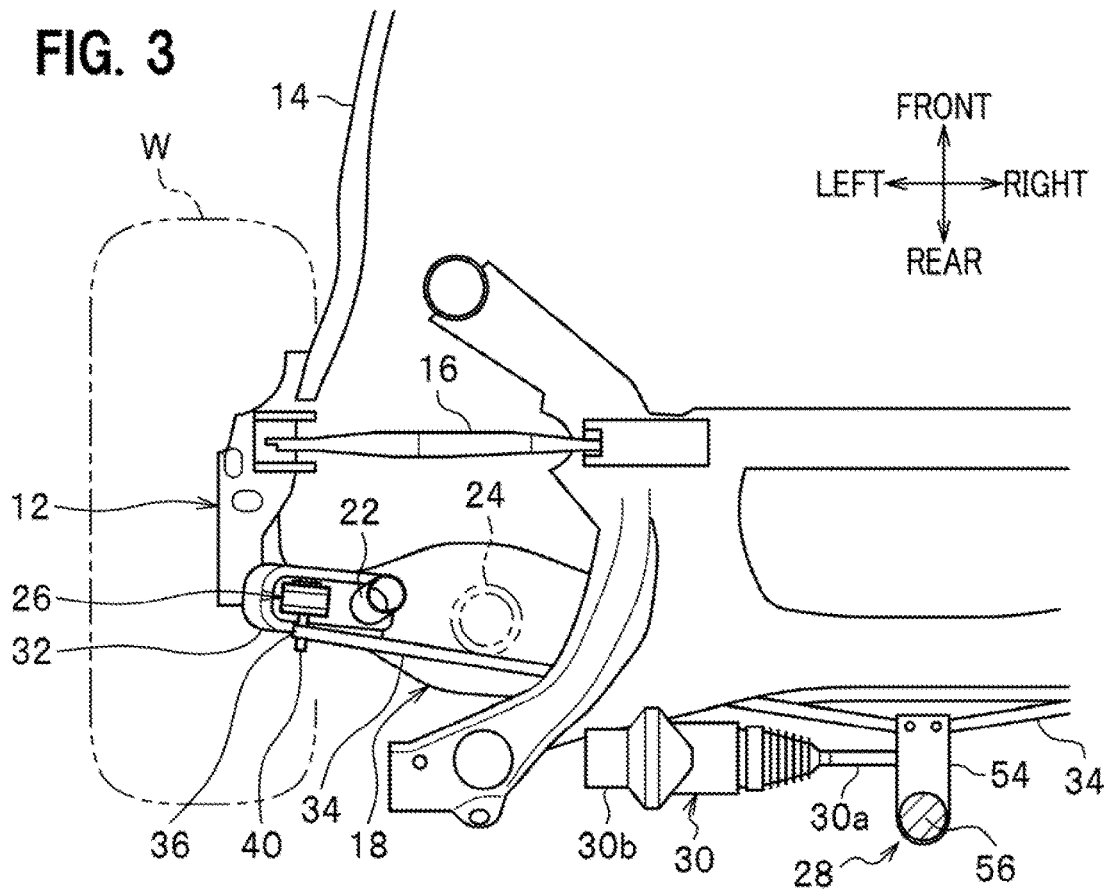
FIG. 3 is a plan view of the suspension device shown in FIG. 2.
Figure 4:
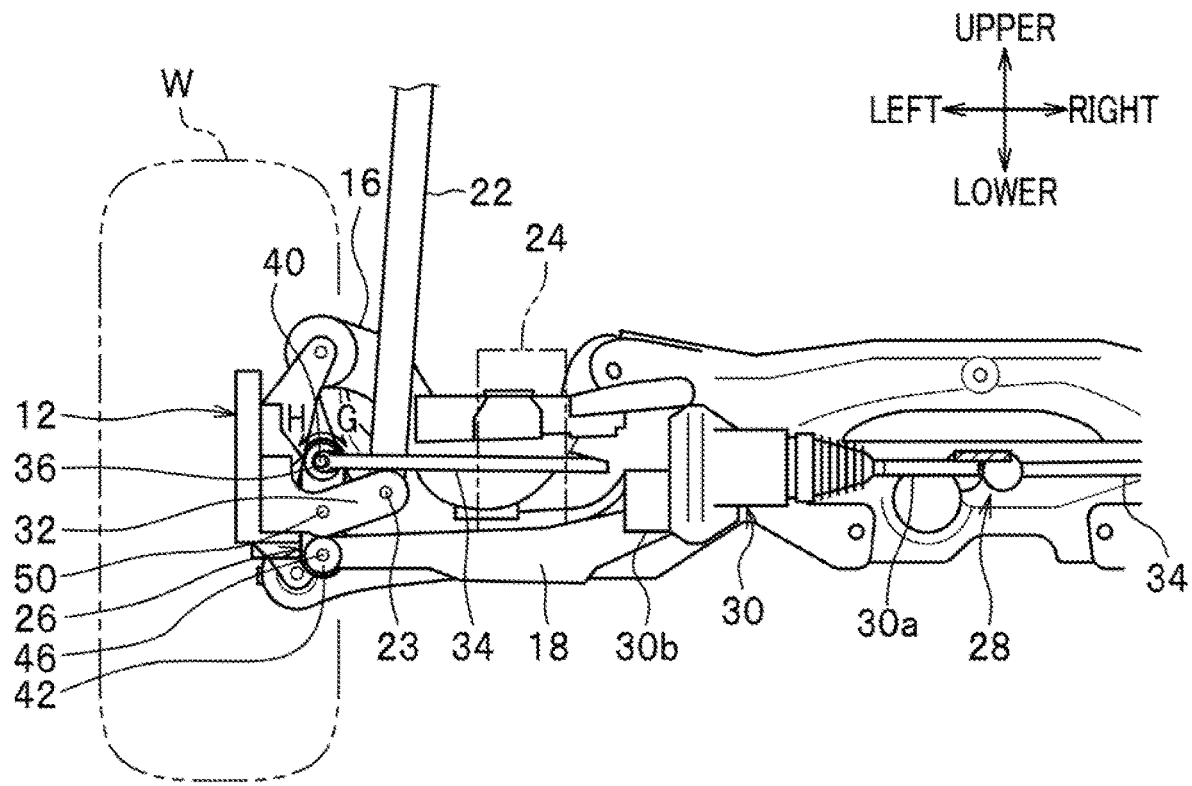
FIG. 4 is a side view of the suspension device shown in FIG. 2, seen from behind the vehicle.
Figure 5:
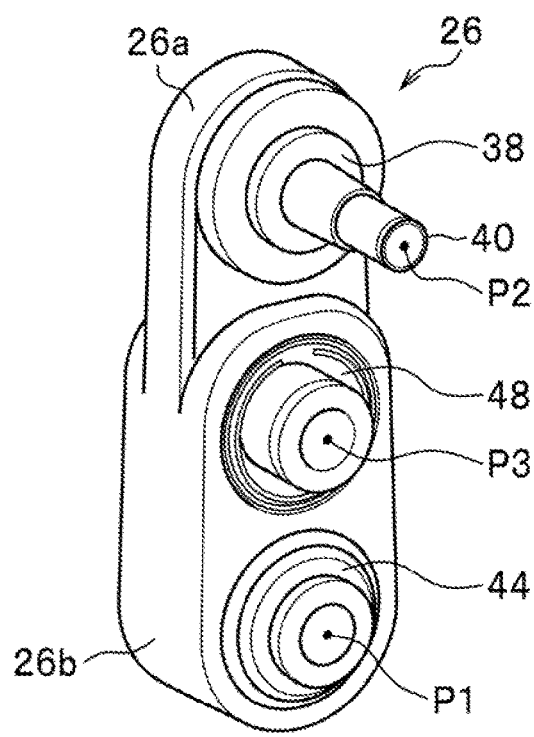
FIG. 5 is a perspective view of a bracket constituting the suspension device.

Next, embodiments of the present invention will be described in detail with reference to the drawings where necessary. FIG. 1 is a plan view of a rear part of a vehicle where a suspension device according to an embodiment of the present invention is incorporated into each of left and right rear wheels. FIG. 2 is a perspective view of the suspension device incorporated into the left rear wheel in FIG. 1. FIG. 3 is a plan view of the suspension device shown in FIG. 2. FIG. 4 is a side view of the suspension device shown in FIG. 2, seen from behind the vehicle. FIG. 5 is a perspective view of a bracket constituting the suspension device. Note that throughout the drawings, "front" and "rear" are based on the front-and-rear direction of the vehicle, "left" and "right" are based on the width direction (lateral direction) of the vehicle, and "upper" and "lower" are based on the up-and-down direction (vertical direction) of the vehicle.

As shown in FIGS. 1 and 2, a suspension device 10 according to the embodiment of the present invention includes a knuckle (retention member) 12, a trailing arm 14, an upper arm 16, a lower arm 18, a control arm 20 (see FIG. 2), a damper 22, and a damper spring 24. Note that the trailing arm 14, the upper arm 16, and the control arm 20 function as "a plurality of arms".

The suspension device 10 further includes a bracket 26 (see FIGS. 1 to 4) that is rotatable between the knuckle 12 and the lower arm 18, a link mechanism 28 (see FIG. 1), and a single electric actuator 30 (see FIG. 1). Note that the suspension device 10 is, as shown in FIG. 1, disposed symmetrically for each of the left and right rear wheels W.

The knuckle 12 rotatably supports a rear wheel W (the left rear wheel W in FIGS. 2 to 4) via an axle (not shown) while allowing the rear wheel W to rotate. As shown in FIG. 2, the knuckle 12 has a vehicle front connection portion 12a, an upper connection portion 12b, and a lower center connection portion 12c. A rear end portion of the trailing arm 14 is fastened to the vehicle front connection portion 12a with a plurality of bolts 13. The trailing arm 14 extends from the knuckle 12 toward substantially the vehicle front. The upper arm 16 is connected to the upper connection portion 12b with a bush.

As shown in FIG. 1, the upper arm 16 extends from the knuckle 12 inward in the vehicle width direction. As shown in FIG. 2, the control arm 20 is connected to the lower center connection portion 12c with a bush. The control arm 20 is disposed at a position coinciding with the upper arm 16 in the up-and-down direction of the vehicle, and extends from the knuckle 12 inward in the vehicle width direction.

As shown in FIG. 2, the knuckle 12 is provided with a forked branching portion 32 at a vehicle rear end portion thereof, protruding inward in the vehicle width direction. An outward end portion (in the vehicle width direction) of the lower arm 18 is connected to the forked branching portion 32. The lower arm 18 extends from the knuckle 12 inward in the vehicle width direction. The forked branching portion 32 is formed by two tongue pieces extending substantially parallel to each other and facing each other. A lower end portion of the damper 22 is connected to an inner end portion (in the vehicle width direction) of the forked branching portion 32 via a fastening pin 23 to be rotatable. Further, in the forked branching portion 32, the bracket 26 extending substantially vertically is provided between the knuckle 12 and the damper 22 arranged in the vehicle width direction.

As shown in FIG. 5, the bracket 26 is shaped substantially like an oval in a side view, and has three rubber bushes lined up along the longer axis and spaced away from one another at predetermined intervals, the rubber bushes being disposed in attachment hole portions (not shown). Note that the shape of the bracket 26 is not limited to the substantial oval shape, and may be other shapes as long as it has one end portion and the other end portion in the axial direction, such as, for example, a rectangular shape or a band shape.

At the vehicle upper side of the lower arm 18, paired tie rods 34, 34 extend in the vehicle width direction and suspend the suspension device 10 for the left rear wheel and the suspension device 10 for the right rear wheel (see FIG. 1). Each tie rod 34 is provided with an annular body 36 at an outer end portion thereof in the vehicle width direction. The annular body 36 is attached, via a rubber bush 38 and a pin 40 (see FIG. 5), to one end portion of the bracket 26 along the longer axis in a single-supported manner, the one end portion being an upper end portion of the bracket 26.

As shown in FIG. 2, the lower arm 18 has a forked branching piece 42 at its outer end portion in the vehicle width direction. The branching piece 42 is attached, via a rubber bush 44 (see FIG. 5) and a pin 46 (see FIG. 2), to the other end portion of the bracket 26 along the longer axis in a double-supported manner, the other end portion being a lower end portion of the bracket 26.

The bracket 26 is attached to the forked branching portion 32 of the knuckle 12 via a rubber bush 48 (see FIG. 5) and a pin 50 (see FIG. 2). The bracket 26 is attached to the forked branching portion 32 substantially at the center of the bracket 26 in a double-supported manner, the center being a middle portion between the one end portion and the other end portion along the longer axis. Note that, as shown in FIG. 5, an upper portion of the bracket 26 is formed by a thin portion 26a which is relatively thin, and a center portion and a lower portion of the bracket 26 are formed by a thick portion 26b thicker than the thin portion 26a.

To review the attachment relations between the bracket 26 and the other members, as shown in FIG. 2, in order from the upper part to the lower part of the bracket 26, the annular body 36, which is the outer end portion (in the vehicle width direction) of the tie rod 34 is attached to the uppermost portion of the bracket 26, the forked branching portion 32 of the knuckle 12 is attached to the center portion of the bracket 26, which is below the uppermost portion of the bracket 26, and the branching piece 42 of the lower arm 18 is attached to the lower portion of the bracket 26, which is below the center portion of the bracket 26.

Using the principle of leverage (a Class 2 lever), the bracket 26 rotates on a point P1 of attachment between the bracket 26 and the lower arm 18 (see FIG. 5) as a rotating fulcrum. The point P1 of attachment between the bracket 26 and the lower arm 18 serves as the "fulcrum". A point P2 of attachment between the bracket 26 and the tie rod 34 (see FIG. 5) serves as the "point of effort". Further, a point P3 of attachment between the bracket 26 and the knuckle 12 (see FIG. 5) serves as the "point of load". By the principle of "a Class 2 lever", a force inputted to the point of effort (the attachment point P2) (a pressing force or a pulling force applied to the bracket 26) is outputted as a double force from the point of load (the attachment point P3).

As shown in FIGS. 1 and 2, the trailing arm 14 supports a vehicle front portion of the knuckle 12. The trailing arm 14 has an arm body portion, a vehicle rear end portion, and a vehicle front end portion. The arm body portion extends substantially in the vehicle front-and-rear direction. The vehicle rear end portion is located at the vehicle rear side of the arm body portion and is connected to the vehicle front connection portion 12a of the knuckle 12 with the bolts 13 (see FIG. 2). The vehicle front end portion is located at the vehicle front side of the arm body portion, and is pivotally attached to a vehicle body member (not shown) with a bush (not shown).

The damper 22 gives damping force to the lower arm 18. As shown in FIG. 2, the lower end of the damper 22 is fastened to the forked branching portion 32 of the knuckle 12 via the fastening pin 23 to be rotatable. The upper end of the damper 22 is fixed to the vehicle body (e.g., an upper wall of a suspension tower).

The damper spring 24 is formed of a coil spring and gives elastic force to the lower arm 18. The lower end of the damper spring 24 is attached onto a spring attachment seat of the lower arm 18, and the upper end of the damper spring 24 is locked on the vehicle body (not shown).

As shown in FIG. 1, the link mechanism 28 has the paired tie rods 34, 34, a pivot arm 54, and a pivot pin 56. The paired tie rods 34, 34 are independently disposed, extend substantially in the vehicle width direction, and are attached, at their outer end portions in the vehicle width direction (the annular bodies 36), to the brackets 26 of the suspension devices 10, 10 disposed for the left and right rear wheels W, W, respectively.

The pivot arm 54 is formed of a substantially rectangular body extending in the vehicle front-and-rear direction in a plan view and is disposed between the paired tie rods 34, 34 extending in the vehicle width direction. A vehicle front end portion of the substantially rectangular pivot arm 54 rotatably supports inner end portions (in the vehicle width direction) of the paired tie rods 34, 34 via pins while allowing the paired tie rods 34, 34 to rotate. A vehicle rear end portion of the pivot arm 54 is pivotally and rotatably supported by the pivot pin 56 (a pivot axis) penetrating through a circular hole portion of the pivot arm 54. The pivot arm 54 is rotatable about the pivot pin 56. Further, a tip end of a rod 30a of the electric actuator 30 is pivotally attached to a center portion of the pivot arm 54.

When the rod 30a is driven back and forth by the electric actuator 30, the pivot arm 54 rotates in predetermined directions about the pivot axis (the axis of the pivot pin 56). When the pivot arm 54 rotates about the pivot axis in the predetermined directions, the paired tie rods 34, 34 shift in the same direction, either to the right in the vehicle width direction or to the left in the vehicle width direction.

The electric actuator 30 is fixed to the vehicle body (not shown) and is formed as a single actuator. The electric actuator 30 has the rod 30a and a motor 30b which has a brush and functions as a driving source. The rod 30a can be driven back and forth in a direction indicated by an arrow. In the housing of the electric actuator 30, for example, a speed reducer, a feed screw mechanism, and the like are disposed. Pushing and pulling the knuckles 12 substantially in the vehicle width direction via the pivot arm 54 connected to the rod 30a, the tie rods 34, 34, and the brackets 26 enables adjustment of the toe angles and camber angles of the left and right rear wheels.

Note that the electric actuator 30 is disposed at the vehicle rear side of the paired tie rods 34, 34 in a plan view, but instead, may be disposed at the vehicle front side of the paired tie rods 34, 34.

The suspension device 10 according to the present embodiment is basically configured as above. Operations and advantageous effects of the suspension device 10 will be described next.

First, the following describes how to change the toe angles of the rear wheels by driving the electric actuator 30.

The motor 30b is driven and rotated to shift the rod 30a of the electric actuator 30 in an extended direction. For example, when the rod 30a is extended in the arrowed direction A (see FIG. 1), the pivot arm 54 rotates about the pivot pin 56 in the arrowed direction C (see FIG. 1). Then, the paired tie rods 34, 34 connected to the pivot arm 54 both shift in the arrowed direction E (see FIG. 1). When each tie rod 34 shifts in the arrowed direction E (see FIG. 1), pulling force is inputted to the bracket 26 from the effort, which is the point P2 of attachment with the tie rod 34 (see FIG. 5). The bracket 26 then rotates about the point P1 of attachment with the lower arm 18 (see FIG. 5) in the arrowed direction G (see FIGS. 2 and 4) as a turning fulcrum.

When the bracket 26 rotates about the point P1 of attachment with the lower arm 18 (see FIG. 5) in the arrowed direction G (see FIGS. 2 and 4), double pushing force (force which is double the force inputted to the point of effort) is outputted from the point of load at the point P3 of attachment with the knuckle 12 (see FIG. 5). This pushing force pushes the rear portion of the knuckle 12 outward in the vehicle width direction and thereby changes the toe angle of the rear wheel W in the toe-in direction.

Conversely, the motor 30b is driven and rotated to shift the rod 30a of the electric actuator 30 in a contracted direction. For example, when the rod 30a is contracted in the arrowed direction B (see FIG. 1), the pivot arm 54 rotates about the pivot pin 56 in the arrowed direction D (see FIG. 1). Then, the paired tie rods 34, 34 connected to the pivot arm 54 both shift in the arrowed direction F (see FIG. 1). When each tie rod 34 shifts in the arrowed direction F (see FIG. 1), pushing force is inputted to the bracket 26 from the point of effort, which is the point P2 of attachment with the tie rod 34 (see FIG. 5). The bracket 26 then rotates about the point P1 of attachment with the lower arm 18 (see FIG. 5) in the arrowed direction H (see FIGS. 2 and 4) as a turning fulcrum.

When the bracket 26 rotates about the point P1 of attachment with the lower arm 18 (see FIG. 5) in the arrowed direction H (see FIGS. 2 and 4), double pulling force is outputted from the point of load at the point P3 of attachment with the knuckle 12 (see FIG. 5). This pulling force pulls the rear portion of the knuckle 12 inward in the vehicle width direction and thereby changes the toe angle of the rear wheel W in the toe-out direction. In the present embodiment as described, in addition to the regular steering of the front wheels by the manipulation of the steering wheel (not shown), the toe angles of the rear wheels W are controlled according to the vehicle speed and the steering angle of the steering wheel, so that straight-running stability or turning performance of the vehicle can be improved.

In the present embodiment, the bracket 26 is rotatable between the forked branching portion 32 of the knuckle 12 and the lower arm 18. In this case, only the bracket 26 rotates about the point P1 of attachment with the lower arm 18 as the turning fulcrum, and the lower arm 18 is not configured to turn or swing. In other words, to change the toe angle of the rear wheel W, only the bracket 26 rotates about the attachment point P1 as the turning fulcrum by being driven by the electric actuator 30, and the driving force of the electric actuator 30 is not transmitted to the lower arm 18. Thus, in the present embodiment, the position of the axis of the damper spring 24 attached to the spring attachment seat of the lower arm 18 stays unchanged at a certain position.

As a result, the present embodiment can keep the position of the axis of the damper spring 24 unchanged when the rear wheel W is steered by the electric actuator 30 and favorably prevent the suspension performance from being affected.

Further, in the present embodiment, each tie rod 34 is attached to the one end portion of the substantially oval bracket 26 along the longer axis, the lower arm 18 is attached to the other end portion of the bracket 26 along the longer axis, and the knuckle 12 is attached to the middle portion of the bracket 26 along the longer axis between the one end portion and the other end portion of the bracket 26. Thus, in the present embodiment, the bracket 26 can turn about the point P1 of attachment with the lower arm 18 as the turning fulcrum using the principle of leverage.

Further, in the present embodiment, the lower arm 18 is turned based on the principle of leverage (a Class 2 lever). Thus, even if force transmitted from the electric actuator 30 and inputted from the point P2 of attachment with the tie rod 34 is small, the toe angle of the rear wheel W can be changed by the force outputted from the point P3 of attachment with the knuckle 12. Consequently, the present embodiment can achieve reduction in the size and weight of the electric actuator 30.

Further, in the present embodiment, the point P2 of attachment between the bracket 26 and the tie rod 34 and the point P1 of attachment between the bracket 26 and the lower arm 18 are disposed adjacently. Thus, for example, even if the rod 30a of the electric actuator 30 is shifted by a small amount, the toe angle of the rear wheel W can be changed by a large amount.

Furthermore, in the present embodiment, when driving force of the electric actuator 30 is inputted via the point P2 of attachment with the tie rod 34 serving as the point of effort, the bracket 26 rotates about the point P1 of attachment with the lower arm 18 as the fulcrum and can change the toe angle of the rear wheel W with the point P3 of attachment with the knuckle 12 serving as the point of load. By employing the "Class 2 lever" configuration in which the point of load is located between the fulcrum and the point of effort, the present embodiment can achieve reduction in the size and weight of the entire suspension device 10.

Figure 6:
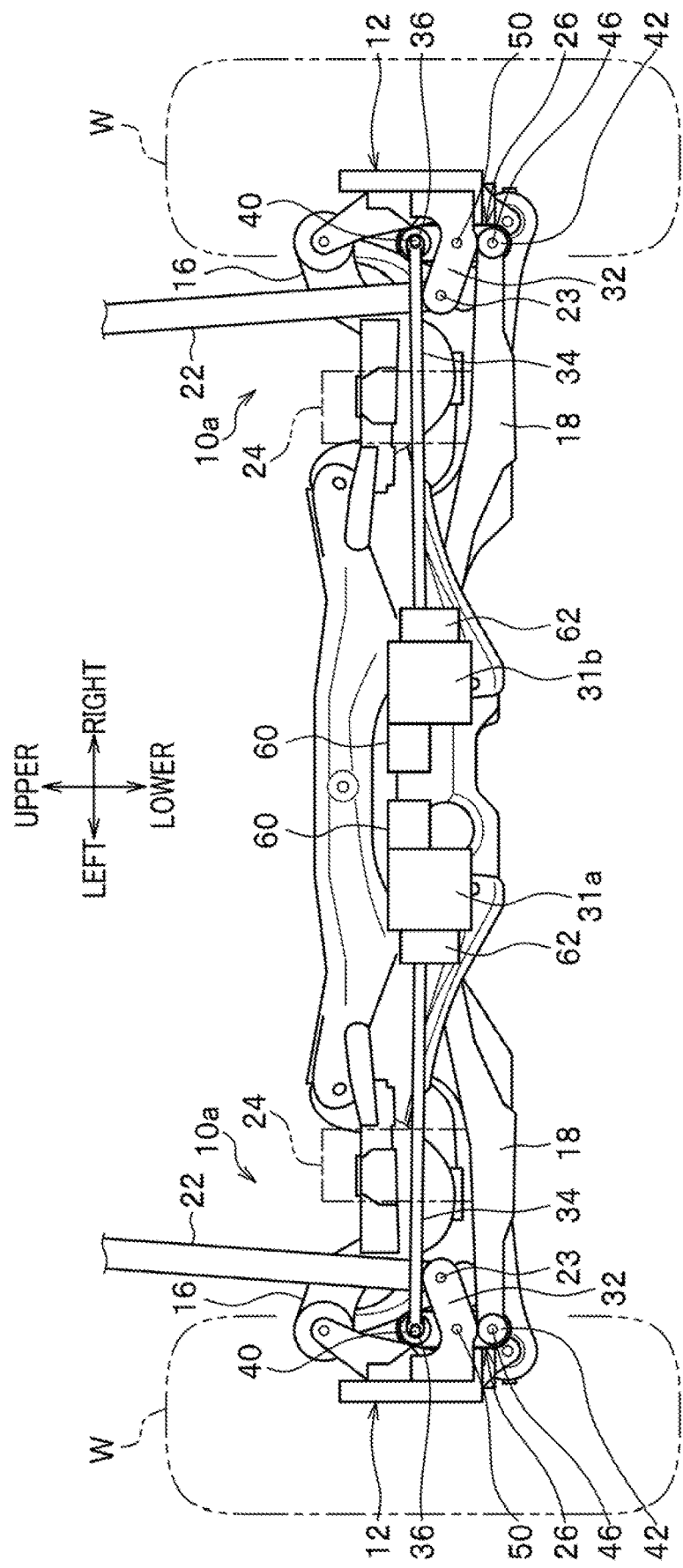
FIG. 6 is a side view of a suspension device according to another embodiment of the present invention incorporated into each of the left and right rear wheels, the side view seen from behind the vehicle.
Figure 7:
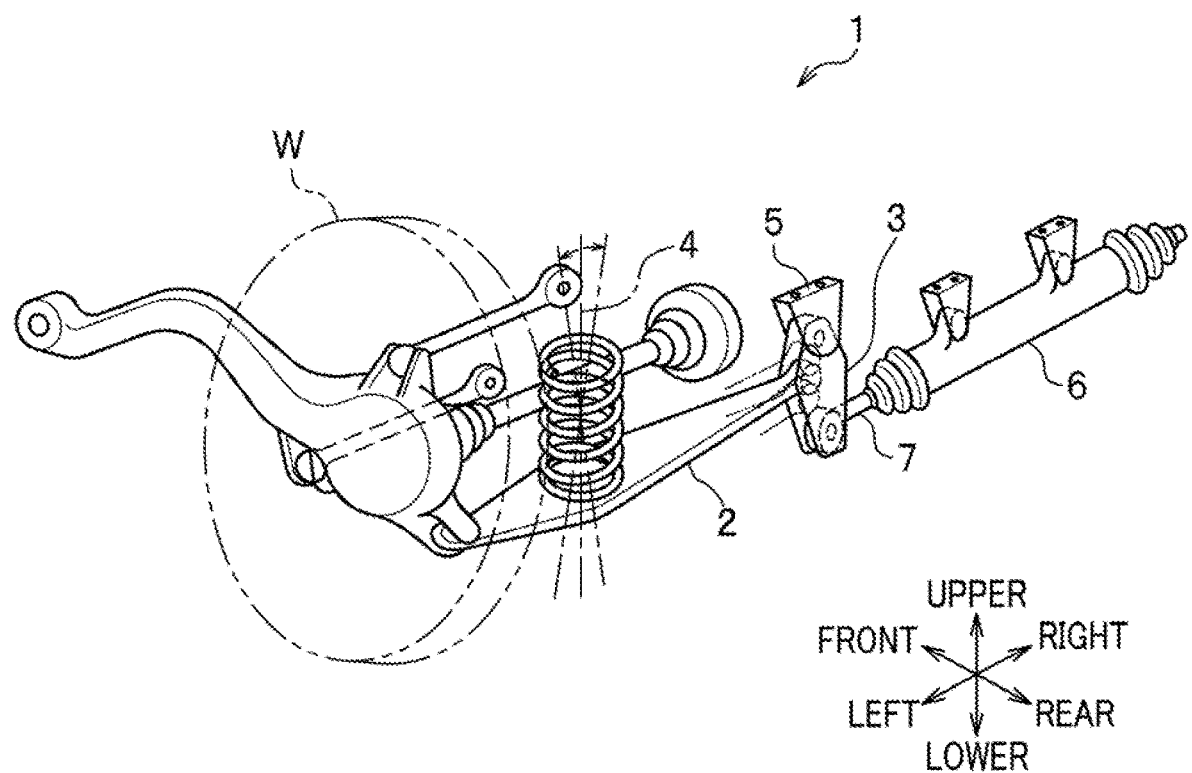
FIG. 7 is a perspective view of a rear suspension device disclosed in Patent Literature 1.

FIG. 6 is a side view of a suspension device according to another embodiment of the present invention incorporated into each of the left and right rear wheels, the side view seen from behind the vehicle.

As shown in FIG. 6, the another embodiment is different from the above-described embodiment having the single electric actuator 30 in that electric actuators 31a, 31b are attached to the left and right paired tie rods 34, 34 respectively. Each of the electric actuators 31*a*, 31*b* is provided with a motor 60 and a speed reducer 62. Note that the electric actuators 31*a*, 31*b*, the motors 60, 60, and the speed reducers 62, 62 each have the same configuration.

When two electric actuators 31*a*, 31*b* are provided and attached to the left and right paired tie rods 34, 34 respectively, for example, a structure similar to that of a rear control device (not shown) set for a five-link rear suspension can be employed.

What is claimed is:

1. A suspension device for a steering vehicle having a plurality of arms that retain a wheel, comprising:
    a retention member that rotatably retains the wheel;
    an actuator that steers the wheel;
    a tie rod that is connected to the actuator and driven back and forth by the actuator;
    a bracket that is rotated by the tie rod; and
    a lower arm attached to the bracket,
    wherein
    the bracket is rotatable between the retention member and the lower arm,
    the tie rod is attached to a first end portion of the bracket at a first attaching point,
    the lower arm is attached to a second end portion of the bracket at a third attaching point,
    the retention member is attached to the bracket between the first end portion and the second end portion at a second attaching point, and
    the first attaching point, the second attaching point, and the third attaching point are lined up along a substantially vertical direction of the steering vehicle and spaced away from one another at predetermined intervals.

2. The suspension device according to claim 1, wherein the bracket is rotatable about the third attaching point with the lower arm as a fulcrum.

3. The suspension device according to claim 2, wherein the first attaching point between the bracket and the tie rod and the third attaching point between the bracket and the lower arm are located adjacently.

4. The suspension device according to claim 2, wherein when driving force of the actuator is inputted to the bracket via the first attaching point with the tie rod serving as a point of effort, the bracket rotates about the third attaching point with the lower arm as a fulcrum and changes a toe angle of the wheel with the second attaching point with the retention member serving as a point of load.

* * * * *